(12) United States Patent
Thistlethwaite et al.

(10) Patent No.: US 12,157,576 B2
(45) Date of Patent: Dec. 3, 2024

(54) SHOCK LOAD ATTENUATION (71) Applicant: Rockwell Collins, Inc., Cedar Rapids, IA (US)

(72) Inventors: Christopher Thistlethwaite, Colorado Springs, CO (US); Andrew Shawver, Colorado Springs, CO (US)

(73) Assignee: ROCKWELL COLLINS, INC., Cedar Rapids, IA (US)

( * ) Notice: Subject to any disclaimer, the term of this patent is extended or adjusted under 35 U.S.C. 154(b) by 28 days.

(21) Appl. No.: 18/176,996

(22) Filed: Mar. 1, 2023

(65) Prior Publication Data
US 2024/0294263 A1    Sep. 5, 2024

(51) Int. Cl.
*B64D 17/36* (2006.01)
*F16F 7/12* (2006.01)
*F16F 7/14* (2006.01)

(52) U.S. Cl.
CPC ............... *B64D 17/36* (2013.01); *F16F 7/12* (2013.01); *F16F 7/14* (2013.01)

(58) Field of Classification Search
CPC .............. B64D 17/36; F16F 7/12; F16F 7/14
See application file for complete search history.

(56) References Cited

U.S. PATENT DOCUMENTS

| | | | |
|---|---|---|---|
| 2,578,753 A * | 12/1951 | Smith | B64D 17/36 242/153 |
| 3,444,957 A | 5/1969 | Gilpin, Jr. | |
| 3,804,698 A | 4/1974 | Kinloch | |
| 5,803,439 A * | 9/1998 | Gilmore | F16F 7/14 267/74 |
| 7,455,155 B2 * | 11/2008 | Castro Fresno | A61P 31/04 188/371 |
| 11,040,778 B2 | 6/2021 | Volny et al. | |
| 11,225,329 B2 | 1/2022 | Volny et al. | |
| 11,286,052 B2 | 3/2022 | Holstine et al. | |
| 11,299,281 B2 | 4/2022 | Holstine et al. | |
| 2007/0125613 A1 * | 6/2007 | Fresno | A61P 35/00 188/371 |

(Continued)

FOREIGN PATENT DOCUMENTS

| | | | | |
|---|---|---|---|---|
| DE | 19520724 A1 * | 12/1996 | ............... | E01F 7/045 |
| EP | 2381125 A1 * | 10/2011 | ............... | E01F 7/045 |
| ES | 2428790 A1 * | 11/2013 | ............... | B63B 21/20 |

(Continued)

OTHER PUBLICATIONS

European Patent Office, European Search Report dated Aug. 1, 2024 in Application No. 24160844.7.

*Primary Examiner* — Joseph W Sanderson
(74) *Attorney, Agent, or Firm* — SNELL & WILMER L.L.P.

(57) ABSTRACT

A shock load attenuation device is provided. The shock load attenuation device includes a crushable material; a first compartment in the crushable material surrounding a first line; and a second compartment in the crushable material surrounding a second line. In response to the first line being acted upon by a first force and the second line being acted upon by a second force, a first loop in the first line is configured to slide along the second line and a first loop in the second line is configured to slide along the first line, crushing the crushable material.

18 Claims, 5 Drawing Sheets

(56) References Cited

U.S. PATENT DOCUMENTS

2022/0033094 A1* 2/2022 Holstine ................ B64D 17/36
2022/0033095 A1* 2/2022 Holstine ................ B64D 25/10

FOREIGN PATENT DOCUMENTS

| FR | 2673253 A1 | * | 8/1992 | ............. A62B 35/04 |
| GB | 587983 | | 5/1947 | |
| GB | 2050560 A | * | 1/1981 | ......... E05D 13/1215 |

* cited by examiner

SHOCK LOAD ATTENUATION

FIELD

The present disclosure relates generally to parachute assemblies and, more specifically, to shock load attenuation for parachutes.

BACKGROUND

Parachutes may be used to slow and stabilize an object (e.g., ejection seat or a person) supported by the parachute. Parachutes typically comprise a canopy to increase drag, and suspension lines coupled to the canopy. The suspension lines may be woven or otherwise bound to one another to form risers configured to attach the object to the parachute and stabilize the object to reduce rotation while under canopy. During the deployment of the parachute, potentially dangerous loads may be generated and imparted onto the occupant as a parachute is opened and begins to slow the occupant's descent. These loads, often referred to as "shock loads" or "snatch loads" present a safety risk to the occupant. The loads may also cause the suspension lines to break. Broken suspension lines tend to produce asymmetric load distribution, which may reduce stability, drag, and symmetry, which may transfer instability to the occupant and/or increase the chances of occupant injury.

SUMMARY

A shock load attenuation device for a parachute assembly is disclosed. The shock load attenuation device includes a crushable material; a first compartment in the crushable material surrounding a first line; and a second compartment in the crushable material surrounding a second line. In response to the first line being acted upon by a first force and the second line being acted upon by a second force, a first loop in the first line is configured to slide along the second line and a first loop in the second line is configured to slide along the first line, crushing the crushable material.

In various embodiments, the first line passes through the first compartment and loops around the second line, and the second line passes through the second compartment and loops around the first line. In various embodiments, the shock load attenuation device further includes a separator configured to separate the first compartment from the second compartment. In various embodiments, the shock load attenuation device further includes a first retainer configured to affix the first loop of the first line to a first end of the crushable material. In various embodiments, the shock load attenuation device further includes a second retainer configured to affix the first loop of the second line to a second end of the crushable material.

In various embodiments, a first end and a second end of the first line couples to a same location on a canopy of a parachute. In various embodiments, a first end and a second end of the second line couples to a same location on a riser of a parachute. In various embodiments, the first force is opposite the second force. In various embodiments, the crushable material is at least one or a combination of a nylon weave, polyester weave, aramid fiber weave, duck cloth, canvas, metal mesh fabric, or multiple small elastomers.

Also disclosed herein is a parachute assembly. The parachute assembly includes a first line; a second line; and a shock load attenuation device. The shock load attenuation device includes a crushable material; a first compartment in the crushable material surrounding the first line; and a second compartment in the crushable material surrounding the second line. In response to the first line being acted upon by a first force and the second line being acted upon by a second force, a first loop in the first line is configured to slide along the second line and a first loop in the second line is configured to slide along the first line, crushing the crushable material.

In various embodiments, the first line passes through the first compartment and loops around the second line, and the second line passes through the second compartment and loops around the first line. In various embodiments, the shock load attenuation device further includes a separator configured to separate the first compartment from the second compartment. In various embodiments, the shock load attenuation device further includes a first retainer configured to affix the first loop of the first line to a first end of the crushable material. In various embodiments, the shock load attenuation device further includes a second retainer configured to affix the first loop of the second line to a second end of the crushable material.

In various embodiments, a first end and a second end of the first line couples to a same location on a canopy of a parachute. In various embodiments, a first end and a second end of the second line couples to a same location on a riser of a parachute. In various embodiments, the first force is opposite the second force. In various embodiments, the crushable material is at least one or a combination of a nylon weave, polyester weave, aramid fiber weave, duck cloth, canvas, metal mesh fabric, or multiple small elastomers.

Also disclosed herein is a method of assembling a parachute assembly, comprising: passing a first end of a first line through a first compartment of a shock load attenuation device; looping the first end of the first line around a second line thereby forming a first loop of the first line; passing the first end of the first line back though the first compartment of the shock load attenuation device; coupling the first end and a second of the first line to a same location on a canopy of a parachute of the parachute assembly; passing a first end of the second line through a second compartment of the shock load attenuation device; looping the first end of the second line around the first line thereby forming a first loop of the second line; passing the first end of the second line back though the second compartment of the shock load attenuation device; and coupling the first end and a second of the second line to a same location on a riser of the parachute assembly, wherein, when the first line is acted upon by a first force and the second line is acted upon by a second force, the first loop in the first line is configured to slide along the second line and the first loop in the second line is configured to slide along the first line crushing a crushable material of the shock load attenuation device. In various embodiments, the crushable material is at least one or a combination of a nylon weave, polyester weave, aramid fiber weave, duck cloth, canvas, metal mesh fabric, or multiple small elastomers.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of embodiments herein makes reference to the accompanying drawings, which show embodiments by way of illustration. While these embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not for limitation. For example, any reference to singular includes plural embodiments, and any reference to more than one component or step may include a singular embodiment or step. Also, any reference to attached, fixed, connected or the like may include permanent, removable, temporary, partial, full and/or any other possible attachment option. Further, any steps in a method discussed herein may be performed in any suitable order or combination.

Disclosed herein is a parachute assembly including shock load attenuators. In accordance with various embodiments, the shock load attenuators include crushable materials to attenuate loads. The crushable materials, in various embodiments, are enclosed within a device that is formed around the suspension, riser, or restraint lines and coupled to the canopy. The suspension, riser, or restraint lines, in various embodiments, are configured within the device so that the suspension, riser, or restraint lines may slide and mechanically act on the crushable material. In various embodiments, additional mechanisms may be provided that reduce higher load impacts or activate the device as a designated load is approached. As the suspension, riser, or restraint lines act upon the crushable material, absorbed energy may be reduced, thereby decreasing the force exerted on the occupant of parachute assembly.

Figure 1:
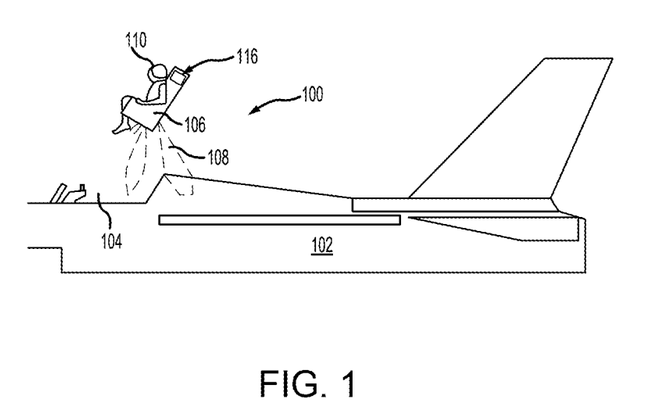
FIG. 1 illustrates an ejection seat being launched from an aircraft cockpit, in accordance with various embodiments.

With reference to FIG. 1, an aircraft ejection system 100 is shown. In accordance with various embodiments, aircraft ejection system 100 may be installed in an aircraft 102 to safely expel an ejection seat 106 and an occupant 110 of ejection seat 106 from a cockpit 104 of aircraft 102. Ejection seat 106 may be urged from cockpit 104 by a propulsion system 108. Aircraft ejection system 100 may include a parachute assembly 116. In various embodiments, prior to deployment of parachute assembly 116, a portion of parachute assembly 116 may be stored within ejection seat 106.

Figure 2:
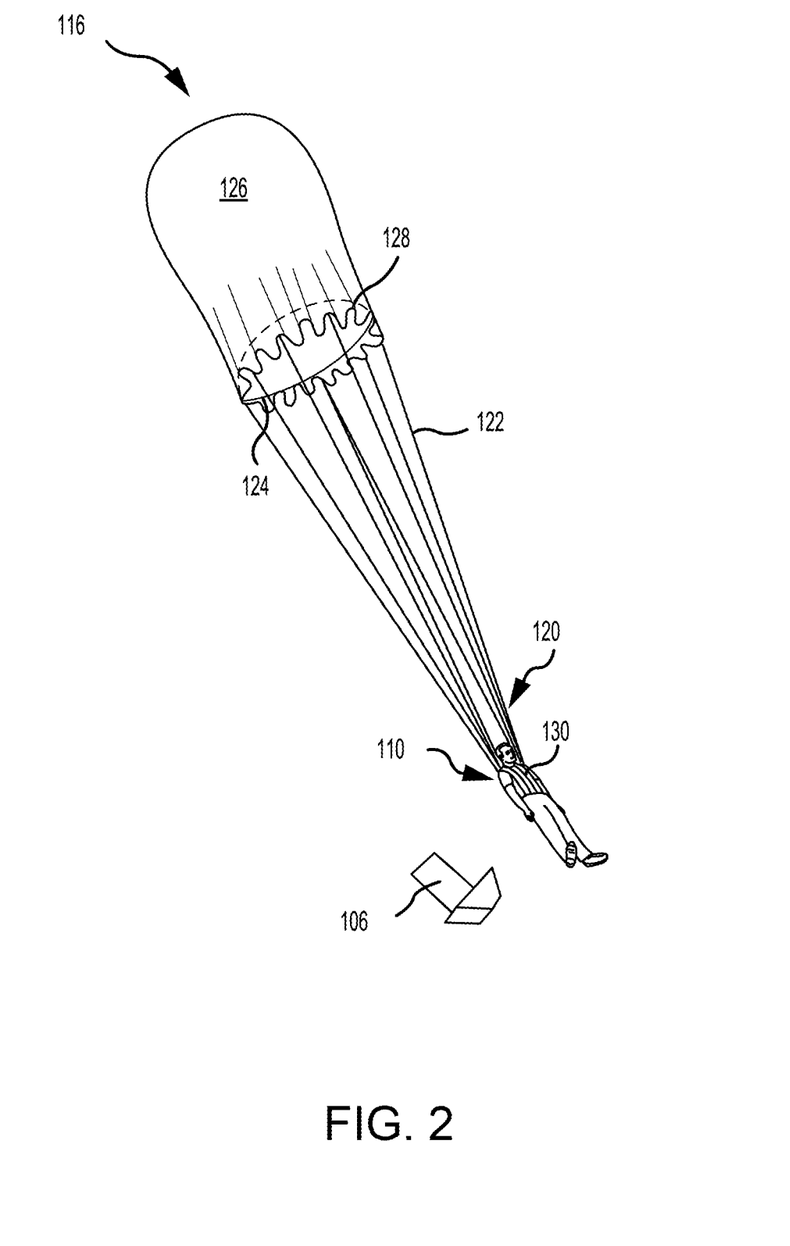
FIG. 2 illustrates a parachute assembly in a deployed state after separation of the occupant from the ejection seat, in accordance with various embodiments.

With reference to FIG. 2, parachute assembly 116 is illustrated in a deployed state. In accordance with various embodiments, parachute assembly 116 may be used to increase a drag of, or otherwise decelerate, occupant 110, in response to occupant 110 being ejected, jumped, ditched, and/or dropped (collectively, "ejected") from an aircraft. Parachute assembly 116 may be configured to deploy upon separation of occupant 110 from ejection seat 106. Stated differently, in various embodiments, deployment of parachute assembly 116 may be configured to separate occupant 110 from ejection seat 106. Parachute assembly 116 may comprise a canopy 126, suspension lines 122, and a set of risers 120.

Upon deployment of parachute assembly 116, canopy 126 may open to increase drag, or otherwise decelerate, occupant 110. Canopy 126 may comprise any suitable type of canopy and any suitable type of material, such as, for example, canvas, silk, nylon, aramid fiber (e.g., KEVLAR®), polyethylene terephthalate, and/or the like. Suspension lines 122 may be coupled to canopy 126 using any suitable attachment technique, such as, for example, through stitching. Suspension lines 122 may be configured to at least partially stabilize deployed canopy 126. In various embodiments, parachute assembly 116 may include one or more reefing line(s) 124. Reefing line 124 may be coupled to canopy 126 proximate a circumferential edge 128 of canopy 126. Reefing line 124 may also be coupled to suspension lines 122. Reefing line 124 is configured to restrict expansion of canopy 126 such that canopy 126 opens in stages. For example, reefing line 124 may be cut, or otherwise severed, at a preselected time after deployment of canopy 126. Prior to cutting reefing line 124, canopy 126 is held at a first, restricted diameter. After reefing line 124 is severed, canopy 126 is able to open further and its diameter increases. Opening canopy 126 in stages may reduce opening shock to parachute assembly 116. The time delay between deploying canopy 126 and severing reefing line 124 may comprise any suitable time delay based on properties of parachute assembly 116, the type of aircraft, and/or the load limitations of the object (e.g., occupant 110) being carried by parachute assembly 116.

In various embodiments, suspension lines 122 may be configured to connect canopy 126 to risers 120. Suspension lines 122 and risers 120 may comprise any suitable material. In various embodiments, suspension lines 122 may comprise a tubular braided material that constricts in diameter under tension, such as, for example, nylon, or aramid fiber (e.g., KEVLAR®), among others. In various embodiments, suspension lines 122 may each comprise a braided material, for example, braided nylon or aramid fiber (e.g., KEVLAR®), among others. Risers 120 may comprise a webbing formed from nylon, aramid fiber (e.g., KEVLAR®), and/or the like. Risers 120 may be configured to attach to a harness 130, or other structure, configured to secure occupant 110 to risers 120. In various embodiments, parachute assembly 116 may comprise a plurality of risers 120 attached to harness 130.

Figure 3:
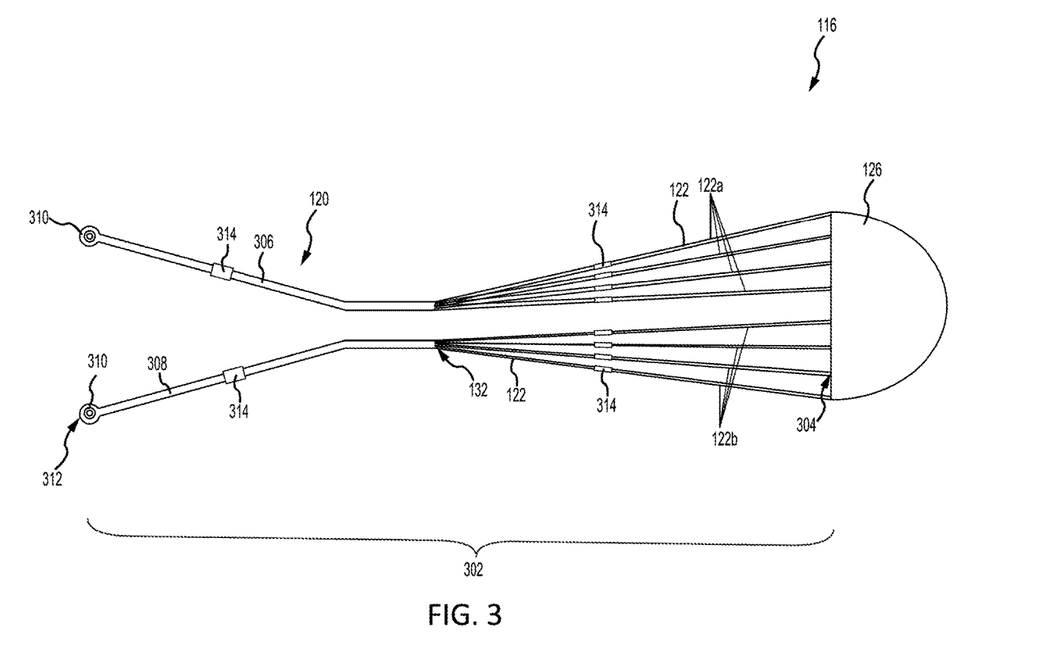
FIG. 3 illustrates a parachute having shock load attenuation devices, in accordance with various embodiments.

With reference to FIG. 3, a parachute assembly 116 having shock load attenuation devices is illustrated, in accordance with various embodiments. Parachute assembly 116 comprises a canopy 126. Parachute assembly 116 also includes a suspension line assembly 302. Suspension line assembly 302 is comprised of suspension lines 122. In various embodiments, suspension lines 122 may be attached to canopy 126 at a first end 304 of suspension line assembly 302. Each of suspension lines 122 may comprise a generally tubular shape that constricts in diameter under tension.

Suspension line assembly 302 includes a first riser 306 and a second riser 308 of the set of risers 120. The first riser 306 and the second riser 308 may be formed by binding, or otherwise coupling, suspension lines 122 together. For example, a first set of suspension lines 122a may be bound or coupled together to form first riser 306, and a second set of suspension lines 122b may be bound or coupled together to form second riser 308. Suspension lines 122a may be bound together via weaving, stitching, adhesive, and/or through any other suitable attachment method to form first riser 306. Suspension lines 122b may be bound together via weaving, stitching, adhesive, and/or through any other suitable attachment method to form second riser 308. While parachute assembly 116 is illustrated as having 8 suspension lines 122, it is further contemplated and understood that parachute assembly 116 may include any number of suspension lines 122, such as, for example, 4 to 32 suspension lines 122, and the first riser 306 and the second riser 308 may be formed from any number of suspension lines 122, such as, for example, 8 to 16 suspension lines 122 per riser, or 2 to 6 suspension lines 122 per riser. Additionally, parachute assembly 116 may include more than 2 risers.

The first riser 306 and the second riser 308 may be configured to attach an object, such as an ejections seat or an occupant harness, to parachute assembly 116. In various embodiments, the first riser 306 and the second riser 308 may each comprise an attachment location 310. Attachment locations 310 may be proximate a second end 312 of suspension line assembly 302. The second end 312 is generally opposite the first end 304 and the canopy 126. Stated differently, suspension lines 122 may be coupled to the canopy 126 at the first end 304 and to an object at the second end 312. The attachment locations 310 may comprise any suitable attachment mechanism for securing an object to parachute assembly 116. In various embodiments, the attachment locations 310 may comprise a loop created by each riser being bound to itself.

In various embodiments, one or more shock load attenuation devices 314 may be located in-line with each suspension line of the suspension lines 122. In various embodiments, one or more shock load attenuation devices 314 may also be located in-line with the first riser 306 and the second riser 308. In various embodiments, the one or more shock load attenuation devices 314 may also be located in-line with arm and leg restraints that restrain the arms and/or legs of the occupant 110 to the ejection seat 106. Accordingly, while the description hereafter references the shock load attenuation devices 314 in relation to the suspension lines 122, the various embodiments are not limited to the shock load attenuation devices 314 being implemented only with the suspension lines 122.

In various embodiments, each of the one or more shock load attenuation devices 314 may include crushable materials that, in response to the parachute being opened and begins to slow the occupant's descent, attenuates potentially dangerous loads that may be generated and imparted onto the occupant. In various embodiments, the crushable materials enclosed within the shock load attenuation devices 314 are formed around the suspension lines 122 coupled to the canopy 126. As will be described hereafter, in various embodiments, the suspension lines 122, that pass within the shock load attenuation devices 314 are configured to slide and mechanically act on the crushable material, creating a compressive force. As the suspension lines 122 act upon the crushable material, absorbed energy may be reduced thereby decreasing the force exerted on the occupant of parachute assembly.

Figure 4:
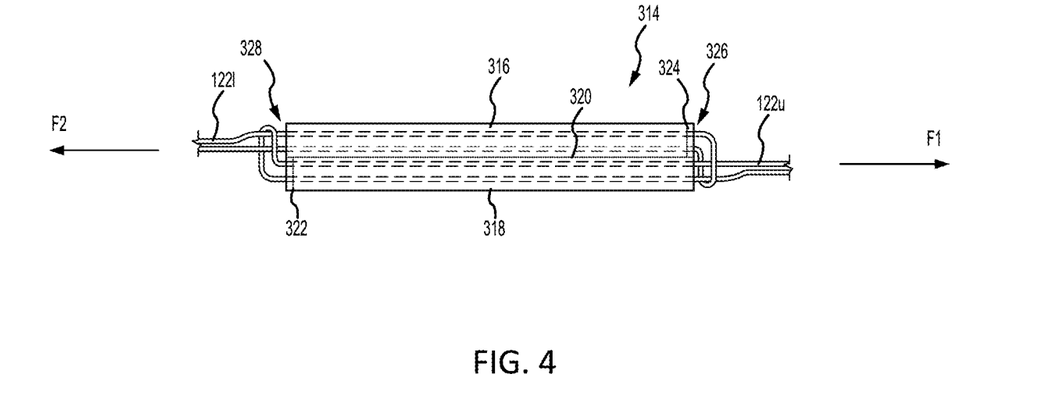
FIG. 4 illustrates a shock load attenuation device, in accordance with various embodiments.

With reference to FIG. 4, a shock load attenuation device 314 is illustrated, in accordance with various embodiments. In various embodiments, shock load attenuation device 314 is configured to have two compartments, first compartment 316 and second compartment 318, divided by separator 320. In various embodiments, the suspension line of the suspension lines 122 that passes within the shock load attenuation device 314 is formed by upper suspension line 122u, which is coupled to the first end 304 and the canopy 126 of FIG. 3, and lower suspension line 122l, which is coupled to either the first riser 306 or the second riser 308 of FIG. 3. In various embodiments, the upper suspension line 122u may be configured in a loop such that the upper suspension line 122u couples to the first end 304 of the canopy 126, passes through the second compartment 318, loops around the lower suspension line 122l, passes back though the second compartment 318, and couples back to the first end 304 of the canopy 126 at the location from which it originated. In that regard, a first end and a second end of the upper suspension line 122u couples to a same point of the canopy 126. In various embodiments, the lower suspension line 122l may be configured in a loop such that the lower suspension line 122l couples either the first riser 306 or the second riser 308, passes through the first compartment 316, loops around the upper suspension line 122u, passes back though the first compartment 316, and couples back the respective one of either the first riser 306 or the second riser 308 from which it originated. In that regard, a first end and a second end of the lower suspension line 122l couples to a same point on either the first riser 306 or the second riser 308. In various embodiments, the portion of the upper suspension line 122u that loops around the lower suspension line 122l may be affixed to a first end 326 of the shock load attenuation device 314 using retainer 322. Similarly, in various embodiments, the portion of the lower suspension line 122l that loops around the upper suspension line 122u may be affixed to a second end 328 the shock load attenuation device 314 using retainer 324.

In various embodiments, the shock load attenuation device 314 device may be manufactured of a crushable material, such as, for example, nylon weave, polyester weave, aramid fiber (e.g., KEVLAR®) weave, duck cloth, canvas, metal mesh fabric, or multiple small elastomers, among others. In various embodiments, the crushable material may include honeycomb type structures or corrugated materials, among others. In that regard, the crushable materials are materials that offer some level of stiffness but can resist compression, and thereby absorb energy and reduce impulse, by mechanically deforming in a compression mode, or the like. In that regard, in various embodiments, separator 320, retainer 322, and retainer 324 may be formed using any suitable attachment technique, such as, for example, through stitching. In various embodiments, by forming separator 320 to separate the upper suspension line 122u from the lower suspension line 122l and by retaining the upper suspension line 122u and the lower suspension line 122l using the retainer 322 and the retainer 324, respectively, the upper suspension line 122u is configured to slide respective from the lower suspension line 122l.

In various embodiments, in response to the parachute being opened and beginning to slow the occupant's descent, a first force F1 is exerted on the upper suspension line 122u caused by the opening of the canopy 126 and a second force F2, which is opposite the first force F1, is exerted on the lower suspension line 122l caused by a load, i.e. the occupant 110 of FIG. 2. In that regard, when the parachute is opened and the first force F1 and the second force F2 act against each other, the looped end of the lower suspension line 122l slides along the upper suspension line 122u, and the looped end of the upper suspension line slides along the lower suspension line 122l thereby mechanically acting upon and crushing the crushable material and thereby attenuating potentially dangerous loads that may be generated and imparted onto the occupant.

Figure 5A:
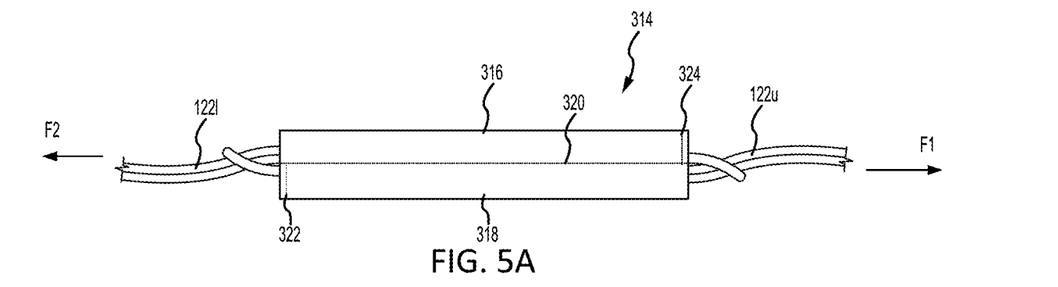
FIGS. 5A and 5B illustrate a shock load attenuation device prior to and after being acted upon by load forces, respectively, in accordance with various embodiments.
Figure 5B:
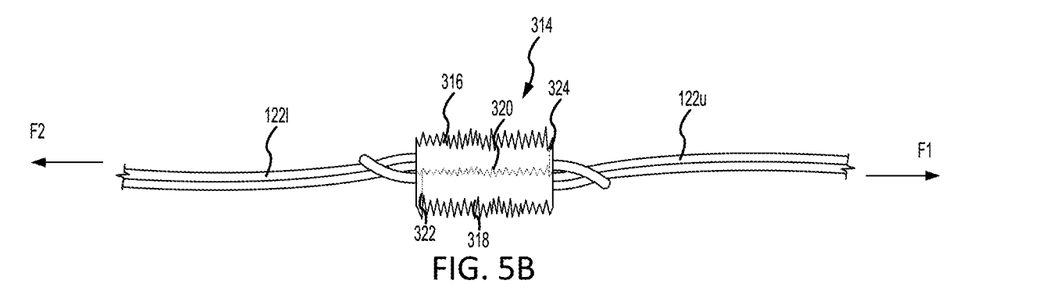

With reference to FIGS. 5A and 5B, a shock load attenuation device 314 prior to and after being acted upon by load forces, respectively, are illustrated, in accordance with various embodiments. In FIG. 5A, the shock load attenuation device 314 is shown prior to the parachute being opened and neither the first force F1 nor the second force F2 are acting upon the shock load attenuation device 314. In FIG. 5B, the parachute is opened and the first force F1 acts on the upper suspension line 122u and the second force F2 acts on the lower suspension line 122l such that the looped end of the lower suspension line 122l slides along the upper suspension line 122u and the looped end of the upper suspension line slides along the lower suspension line 122l thereby mechanically acting upon and crushing the crushable material of the shock load attenuation device 314 thereby attenuating potentially dangerous loads that may be generated and imparted onto the occupant.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods, and apparatus are provided herein. In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 35 U.S.C. 112 (f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A shock load attenuation device for a parachute assembly, the shock load attenuation device comprising:
   a crushable material;
   a first compartment in the crushable material surrounding a first line; and
   a second compartment in the crushable material surrounding a second line,
   wherein the first line passes through the first compartment, loops around the second line, and passes back through the first compartment,
   wherein the second line passes through the second compartment, loops around the first line, and passes back through the second compartment, and
   wherein, in response to the first line being acted upon by a first force and the second line being acted upon by a second force, a first loop in the first line is configured to slide along the second line and a first loop in the second line is configured to slide along the first line, crushing the crushable material.

2. The shock load attenuation device of claim 1, further comprising:
   a separator configured to separate the first compartment from the second compartment.

3. The shock load attenuation device of claim 1, further comprising:
   a first retainer configured to affix the first loop of the first line to a first end of the crushable material.

4. The shock load attenuation device of claim 1, further comprising:
   a second retainer configured to affix the first loop of the second line to a second end of the crushable material.

5. The shock load attenuation device of claim 1, wherein a first end and a second end of the first line are configured to couple to a same location on a canopy of a parachute.

6. The shock load attenuation device of claim 1, wherein a first end and a second end of the second line are configured to couple to a same location on a riser of a parachute.

7. The shock load attenuation device of claim 1, wherein the first force is opposite the second force.

8. The shock load attenuation device of claim 1, wherein the crushable material is at least one or a combination of a nylon weave, polyester weave, aramid fiber weave, duck cloth, canvas, metal mesh fabric, or multiple elastomers.

9. A parachute, comprising:
   a canopy;
   a riser;
   a first line coupled to the canopy;
   a second line coupled to the riser; and
   a shock load attenuation device, wherein the shock load attenuation device comprises:
      a crushable material;
      a first compartment in the crushable material surrounding the first line; and
      a second compartment in the crushable material surrounding the second line,
      wherein the first line passes through the first compartment, loops around the second line, and passes back through the first compartment,
      wherein the second line passes through the second compartment, loops around the first line, and passes back through the second compartment, and
      wherein, in response to the first line being acted upon by a first force and the second line being acted upon by a second force, a first loop in the first line is configured to slide along the second line and a first loop in the second line is configured to slide along the first line, crushing the crushable material.

10. The parachute of claim 9, wherein the shock load attenuation device further comprises:
a separator configured to separate the first compartment from the second compartment.

11. The parachute of claim 9, wherein the shock load attenuation device further comprises:
a first retainer configured to affix the first loop of the first line to a first end of the crushable material.

12. The parachute of claim 9, wherein the shock load attenuation device further comprises:
a second retainer configured to affix the first loop of the second line to a second end of the crushable material.

13. The parachute of claim 9, wherein a first end and a second end of the first line couples to a same location on the canopy of a parachute.

14. The parachute of claim 9, wherein a first end and a second end of the second line couples to a same location on the riser of a parachute.

15. The parachute of claim 9, wherein the first force is opposite the second force.

16. The parachute of claim 9, wherein the crushable material is at least one or a combination of a nylon weave, polyester weave, aramid fiber weave, duck cloth, canvas, metal mesh fabric, or multiple elastomers.

17. A method of assembling a parachute assembly, comprising:
passing a first end of a first line through a first compartment of a shock load attenuation device;
looping the first end of the first line around a second line thereby forming a first loop of the first line;
passing the first end of the first line back though the first compartment of the shock load attenuation device;
coupling the first end and a second end of the first line to a same location on a canopy of a parachute of the parachute assembly;
passing a first end of the second line through a second compartment of the shock load attenuation device;
looping the first end of the second line around the first line thereby forming a first loop of the second line;
passing the first end of the second line back though the second compartment of the shock load attenuation device; and
coupling the first end and a second end of the second line to a same location on a riser of the parachute assembly.

18. The method of claim 17, wherein the crushable material is at least one or a combination of a nylon weave, polyester weave, aramid fiber weave, duck cloth, canvas, metal mesh fabric, or multiple elastomers.

* * * * *